United States Patent
Furman et al.

(10) Patent No.: US 9,103,046 B2
(45) Date of Patent: Aug. 11, 2015

(54) ELECTROPHORETIC FORMATION OF NANOSTRUCTURED COMPOSITES

(75) Inventors: Benjamin R. Furman, San Antonio, TX (US); Stephen T. Wellinghoff, San Antonio, TX (US); Charles K. Baker, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 809 days.

(21) Appl. No.: 12/831,739

(22) Filed: Jul. 7, 2010

(65) Prior Publication Data

US 2012/0006686 A1    Jan. 12, 2012

(51) Int. Cl.

| | | |
|---|---|---|
| *C25D 9/00* | (2006.01) | |
| *C25D 13/00* | (2006.01) | |
| *C25D 15/00* | (2006.01) | |
| *C09D 5/44* | (2006.01) | |
| *C09D 5/46* | (2006.01) | |
| *B01D 57/02* | (2006.01) | |
| *C25D 1/12* | (2006.01) | |
| *C09D 7/12* | (2006.01) | |
| *C25D 1/04* | (2006.01) | |
| *C25D 7/06* | (2006.01) | |

(52) U.S. Cl.
CPC *C25D 1/12* (2013.01); *C09D 5/448* (2013.01); *C09D 7/1266* (2013.01); *C09D 7/1275* (2013.01); *C25D 1/04* (2013.01); *C25D 7/0621* (2013.01)

(58) Field of Classification Search
CPC .......... C25D 9/00; C25D 13/00; C25D 15/00; C09D 5/44; C09D 5/46; B01D 57/02
USPC .............................. 205/109, 80, 137; 204/450
See application file for complete search history.

(56) References Cited

U.S. PATENT DOCUMENTS

| | | | |
|---|---|---|---|
| 3,654,116 A * | 4/1972 | Inoue ....................... | 204/224 M |
| 5,905,130 A | 5/1999 | Nakahara et al. | |
| 7,041,234 B2 | 5/2006 | Wellinghoff et al. | |
| 7,094,358 B2 | 8/2006 | Norling et al. | |
| 7,094,360 B2 | 8/2006 | Wellinghoff et al. | |
| 7,098,359 B2 | 8/2006 | Wellinghoff et al. | |
| 7,108,810 B2 | 9/2006 | Nakamura et al. | |
| 7,135,589 B2 | 11/2006 | Norling et al. | |
| 7,183,139 B2 | 2/2007 | Japaraman et al. | |
| 7,238,831 B2 | 7/2007 | Wellinghoff et al. | |
| 7,550,099 B2 | 6/2009 | Braterman et al. | |
| 7,569,318 B2 | 8/2009 | Michel et al. | |

(Continued)

OTHER PUBLICATIONS

Roy, et al., "Synthesis and characterization of {Mo72Fe30}-coated large hexagonal gibbsite γ-Al(OH)3 platelets," Dalton Trans., 2008, pp. 2861-2865.

(Continued)

*Primary Examiner* — Zulmariam Mendez
(74) *Attorney, Agent, or Firm* — Grossman, Tucker et al.

(57) ABSTRACT

The present invention is directed to composite films containing nanostructures within a polymer or monomeric matrix which composite may be formed on a metallic substrate and subsequently removed to provide bulk material. The nanostructures and polymer or monomer matrix may be assembled electrophoretically by initially providing a mixture of the nanostructures and polymer or monomer matrix material within generally anhydrous environments such as polar aprotic solvents followed by deposition of the composite film material.

34 Claims, 6 Drawing Sheets

(56) References Cited

U.S. PATENT DOCUMENTS

| | | | |
|---|---|---|---|
| 7,611,812 | B2 | 11/2009 | Michel et al. |
| 7,622,157 | B2 | 11/2009 | Falk et al. |
| 7,666,373 | B2 | 2/2010 | Rosenberg |
| 7,709,411 | B2 | 5/2010 | Zhou et al. |
| 2003/0036609 | A1 | 2/2003 | Wellinghoff et al. |
| 2003/0055280 | A1 | 3/2003 | Wellinghoff et al. |
| 2003/0125435 | A1 | 7/2003 | Norling et al. |
| 2004/0206934 | A1 | 10/2004 | Norling et al. |
| 2010/0027192 | A1* | 2/2010 | Perry et al. ............ 361/323 |
| 2013/0329272 | A1* | 12/2013 | Matsumura et al. ........ 359/238 |

OTHER PUBLICATIONS

Leroux, et al., "Polymer Interleaved Layered Double Hydroxide: A New Emerging Class of Nanocomposites," Chem. Mater. 2001, 13, pp. 3507-3515.

Lin, et al., "Electrophoretic Deposition of Biomimetic Nanocomposites," Electrochemistry Communications 11 (2009) 14-17.

Lin, et al., "Bioinspired Assembly of Colloidal Nanoplatelets by Electric Field," Chem. Mater. 2009, 21, pp. 2039-2044.

Gan, et al., "Charging Behavior of the Gibbsite Basal (001) Surface in NaCl Solution Investigated by AFM Colloidal Probe Technique," Langmuir 2006, 22, pp. 6087-6092.

Wierenga, et al., "Aqueous dispersions of colloidal gibbsite platelets: synthesis, characterization and intrinsic viscosity measurements," Collides and Surfaces A: Physiochemical and Engineering Aspects 134 (1998) pp. 359-371.

Van De Kooij, et al., "Formation of Nematic Liquid Crystals in Suspension of Hard Colloidal Platelets," J. Phys. Chem. B. 1998, 102, pp. 7829-7832.

* cited by examiner

ELECTROPHORETIC FORMATION OF NANOSTRUCTURED COMPOSITES

STATEMENT REGARDING FEDERALLY SPONSORED RESEARCH OR DEVELOPMENT

This invention was made with government support under contract number DE018370 awarded by the National Institutes of Health. The government has certain rights in the invention.

FIELD OF THE INVENTION

The present invention is directed to composite films containing nanostructures within a polymer or monomeric matrix which composite may be formed on a metallic substrate and subsequently removed to provide bulk material. The nanostructures and polymer or monomer matrix may be assembled electrophoretically by initially providing a mixture of the nanostructures and polymer or monomer matrix material within generally anhydrous environments such as polar aprotic solvents followed by deposition of the composite film material.

BACKGROUND

Various problems remain with respect to the preparation of a resin-based nanocomposite material. For example, problems may include relatively high polymerization shrinkage, relatively low filler loadings, relatively low wear resistance, relatively low fracture toughness, and relatively poor tensile properties. For inorganic, equiaxed, silica-based fillers, a very high loading (>60% v/v) may be used in order to achieve improve compressive strength. However, such loading will typically compromise tensile loads.

High-aspect-ratio fillers, such as microscopic whiskers or plate-like clay nanoparticles, may increase the composite elastic modulus and support relatively higher tensile loads. Unfortunately, these fillers have poor packing efficiencies under conventional mixing and casting procedures. Therefore, a method is needed for depositing nanostructures comprising, e.g., inorganic fillers within an organic matrix in a relatively organized manner. Furthermore, it would be desirable to co-deposit such nanostructures within an organic matrix material such that a secondary infiltration processes for filling the remaining interstitial spaces is reduced or avoided.

SUMMARY

A method of forming a composite material containing nanostructures comprising providing nanostructured solids in an organic liquid media wherein the media has a water content of less than or equal to 10.0% by volume and wherein the liquid media also includes an organic matrix material. This may then be followed by application of an electric field to the organic liquid media in the presence of a conductive substrate and depositing the composite material containing the nanostructured solids together with the organic matrix material on the conductive substrate. The method may be made continuous and the nanostructures may include nanoparticles and/or nanoplatelet and/or nanotube type geometry.

In another exemplary embodiment, the present disclosure again relates to a method of forming a composite material containing nanostructures comprising placing a nanostructured solid in an aqueous liquid medium and exchanging said aqueous medium for an organic liquid media wherein the organic media has a water content of less than or equal to 10.0% by volume. This may then be followed by placing an organic matrix material in said organic liquid media and applying an electric field to the organic liquid media in the presence of a conductive substrate and depositing on the conductive substrate a composite material containing the nanostructured solids and the organic matrix material.

In another exemplary embodiment the present disclosure again relates to a method of forming a composite material containing nanostructures comprising providing nanostructures containing layered double hydroxides in platelet form in an organic liquid media. The platelets may have an aspect ratio of greater than or equal to 3.0 and the organic media has a water content of less than or equal to 10.0% by volume. The organic liquid media may also contain an organic matrix material and one may then apply an electric field to the organic liquid media in the presence of a conductive substrate and deposit on the conductive substrate a composite material containing the nanostructured solids and the organic matrix material wherein the composite material has a thickness of 10 µm to 1000 µm, the layered double hydroxides are present at a level of up to 80% by volume in said organic matrix and the level of voids in the deposited organic matrix material containing the nanostructured solids is less than or equal to 5.0% by volume.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

As noted above, the composite films herein generally comprise nanostructures dispersed within a polymer or monomer type matrix. Reference to nanostructures may be understood as any solid (e.g., particles, rod, tubes and/or platelets) having at least one dimension of 1-999 nm, including all values therein, in 1.0 nm increments. For example, the nanoparticles utilized herein may specifically comprise those particles having diameters of 1 nm, 2 nm, 3 nm, etc., up to 999 nm. With respect to the above referenced nanotube and/or nanorod type structures, such may now be understood as any tubular or rod type geometry that similarly has at least one nanometer dimension in the range of 1 nm to 999 nm, including all values therein, in 1.0 nm increments. Therefore it may be appreciated that other dimensions of the nanostructures disclosed herein may exceed nanometer dimensions (e.g. the nanotube and/or nanorod length) and achieve levels of up to and including 10 microns.

Preferably, the nanostructures may be in the form of nanoplatelets with an aspect ratio (1/d) greater than or equal to 3.0, and wherein the platelets also have one dimension (e.g. thickness) in the range of 1-999 nm. The term "aspect ratio" is another defining feature of platelet particles. Aspect ratio is the minimum width of a platelet particle divided by its thickness. As noted, the platelets may therefore have a thickness of 1-999 nm, but other dimensions of the platelets may be much larger and up to 10 microns. Furthermore, the level of any of the aforementioned nanostructures within a given film may include up to 80% volume fraction (v/v). That is, the level of nanostructures may be up to an include 80% by volume within the organic matrix. Accordingly, the level of nanostructures may be present in the range of 0.1% v/v to 80% v/v, and all values therein, in 0.1% v/v increments.

The nanostructure composition may preferably be inorganic based and may therefore include layered double hydroxide (LDH) materials. Such materials may be understood as a class of compounds which consist of sheets of the hydroxides of two or more metals of different valence. The metal hydroxide layers are positively charged, so charge neutrality requires that charge balancing or "guest" anions must be intercalated between the layers. Water is also usually present, hydrogen-bonded both to the hydroxyl ions of the metal hydroxide layers and to the intercalated guest anions.

LDHs are often referred to as hydrotalcite-type minerals and commonly represented by the formula $[M^{z+}_{1-x}M^{3+}_{x}(OH)_2]^{q+}(X^{n-})_{q/n} \cdot yH_2O]$. Most commonly, z=2, and $M^{2+}=Ca^{2+}$, $Mg^{2+}$, $Mn^{2+}$, $Fe^{2+}$, $Co^{2+}$, $Ni^{2+}$, $Cu^{2+}$ or $Zn^{2+}$; hence q=x. Pure phases have been shown to exist over the range $0.2 \leq x \leq 0.33$. However, values of x have been reported in the range $0.1 \leq x \leq 0.5$. Also possible is z=1, where $M^+=Li^+$ and $M^{3+}=Al^{3+}$. In this case q=2x-1. The latter family of materials can be described by the formula $[LiAl_2(OH)_6]X \cdot yH_2O$ ($LiAl_2$—X)). X represents a generic interlayer anion and the value of y is normally found to be between 0.5-4. LDHs may be formed with a wide variety of interlayer anions X (e.g. OH, Cl, Br, and $NO_3$).

The nanostructure composition may also include metal phosphates and phosphonates, such as calcium phosphate, calcium phosphonates, magnesium phosphate, magnesium phosphonates, zirconium phosphate, zirconium phosphonates, titanium phosphate and titanium phosphonate, silicates and metal oxides. Preferred compositions are hydrotalcites, calcium phosphates such as apatite and brushite, zirconium phosphonates, and zirconium oxides. The nanostructure composition may also include spinels, which may be understood as a class of minerals of general formulation $A^{2+}B_2^{3+}O_4^{2-}$, where A and B can be divalent, trivalent or quadrivalent cations, including magnesium, zinc, iron, manganese, aluminum, chromium, titanium and silicon. A and B can also be the same metal under different charges, such as in the case $Fe_3O_4$ (as $Fe^{2+}Fe_2^{3+}O_4^{2-}$). In addition, the nanostructure composition herein may include zeolites (aluminosilicates) as well as metal-organic frameworks (MOF). A MOF may be generally understood as crystalline compounds consisting of metal ions or cluster coordinated to organic molecules to form one-, two- or three-dimensional structure that may be porous.

One preferred nanostructure to disperse within the matrix may include the layered double hydroxide gibbsite in nanoplatelet form. Gibbsite is aluminum trihydroxide ($Al(OH)_3$) which is also sometimes referred to in the literature as "hydrate" or "alumina trihydrate" and sometimes expressed using the formula $Al_2O_3$-$3H_2O$.

The various nanostructured materials for incorporation in the organic matrix may all be surface modified to improve their mixing with the organic solvents utilized in the electrophoretic deposition described herein. For example, the nanostructured material surface may be associated (e.g. through polar interactions and/or covalent bonding) with ionic and/or non-ionic surfactants. Other associations may be made with phospholipids and organic sulfonate compounds such as dodecylbenzene sulfonate as well as organo phosphonates. The nanostructured surface may also be associated with monomeric precursors to the ensuing organic matrix material wherein such monomers again provide hydrophobic (repels water) and hydrophilic (attracts water) functionality to improve mixing and dispersion in the electrophoretic organic solvent media. Such monomers may include, e.g, vinyl sulfonates, vinyl quaternary amines. In addition, in the situation where one may utilize an inorganic based nanostructured material, such as an inorganic nanoparticle, one may utilize an organosiloxane, wherein the inorganic siloxane may be associated with the inorganic nanoparticle and the organo group providing improved ability to disperse in the organic solvent media.

As may therefore be appreciated, the nanostructured materials herein such as the inorganic nanoparticles may also be treated with a vinyl-siloxane thereby providing functionality (the vinyl group) for covalently attaching the nanoparticle to another polymerizable monomer which upon polymerization serves as the organic matrix for the nanoparticles. However, it should be noted that the vinyl group of such siloxane is only one example of a reactive terminal group that may be utilized to covalently attach to other polymerizable monomers, and other reactive terminal groups may include allyl functionality, substituted vinyl functionality (e.g., styrene functionality) as well as reactive organic base and/or acid groups, such as amine groups or carboxylic acid groups, and strained ring functionality, such as epoxy type functionality.

The organic matrix material herein may preferably include polymeric resins and/or as now noted above, precursor compounds (e.g. monomers) that may be polymerized before, during or even after electrophoretic deposition in the presence of the nanostructured materials noted herein. Such polymer resins may preferably include vinyl based monomer $[CH_2=C(R1)(R2)]$ and corresponding polymer resins which may be understood as having the repeating unit:

wherein R1 and R2 may be selected from hydrogen, alkyl groups, alkylene groups, aromatic groups, ester groups and/or carboxylic acid type functionality, as well as metal salts thereof, thereby providing charged ionomer type functionality. The value of n may be from 10-10,000, including all values and numerical increments therein. Accordingly, a preferred polymer may include a polyacrylate which may include the following general structure:

wherein R1 and n may be as defined above and R3 may be any alkyl or aromatic group.

The polymers for use herein may also include thermoset (crosslinked) type polymers and their associated monomeric precursors such as di or triacrylates. For example, it is contemplated herein that one may utilize epoxy based polymers, an example of which may include the use the precursors of bisphenol A and epichlorohydrin to provide the epoxy based polymer (diglycidyl ethers of bisphenol A of varying molecular weights of 340-5000) which may then be crosslinked at room temperature with aliphatic amines or at elevated temperature with organic dicarboxylic acids, typically aromatic based dicarboxylic acids or acid anhydrides, such as trimellitic anhydride (TMA).

In addition, one may utilize inorganic type polymers and their associated monomeric precursors. Inorganic polymers may be understood as any polymer containing a backbone that does not include carbon. One preferred inorganic polymer herein includes siloxane based polymers, which may have the following general structure:

wherein R1 and R2 may be selected from alkyl groups, alkylene groups and/or aromatic groups and the value of n may be from 10-10,000, including all values and numerical increments therein. Other inorganic polymers and associated monomeric precursors contemplated herein include polysilazanes (polymer containing Si—N linkages in the main chain) as well as polysilsesquioxanes (compounds with an empirical formula $RSiO_{1.5}$ where R is either hydrogen or an alkyl, alkene, aryl or arylene group.

Furthermore, the polymers and associated monomeric precursors may extend to polymers such as polylactones such as polycaprolactone and/or polylactide, polyglycolides, and polylactide-co-glycolides. In addition, all of the polymers disclosed herein may also include other molecules for deposition and formation of the composite film materials. Such molecules may therefore include polymerization initiators (e.g. radical, cationic or anionic type initiators), drugs (e.g. anabolic statins), drug adjuvants, biocides or gene therapeutics. Such additional molecules may be present at a level of 0-15% (w/w).

Figure 1:
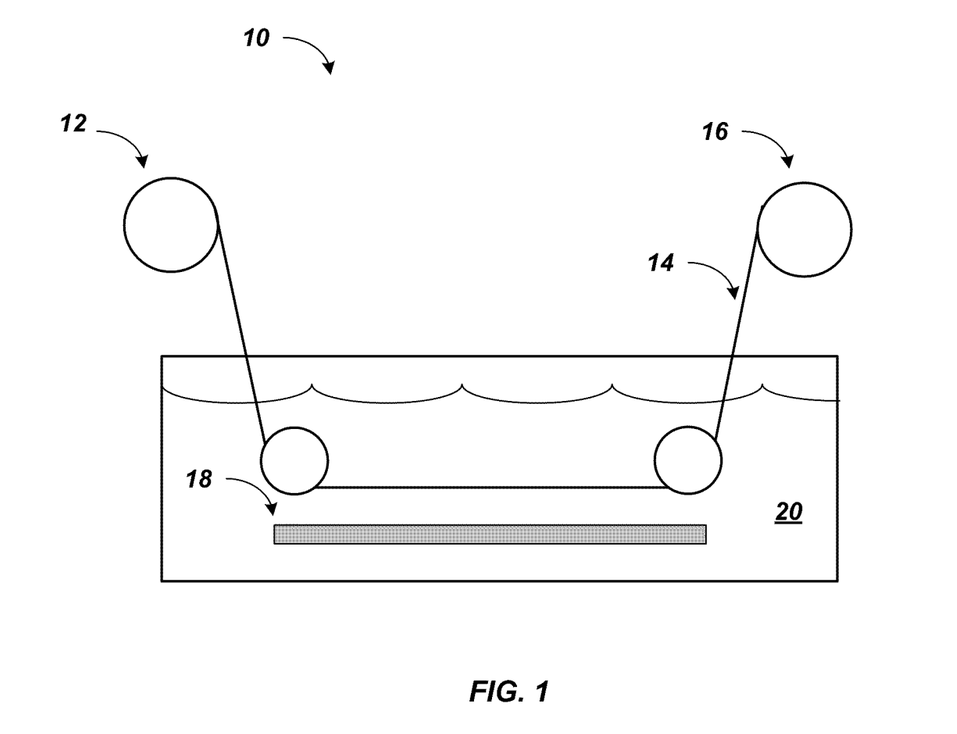
FIG. 1 illustrates a roll-to-roll coating apparatus for electrophoretic deposition of the nanostructure composites.

The nanostructured composite films herein are preferably formed by either a continuous or non-continuous procedure. One preferred process includes a roll-to-roll continuous electrophoretic deposition procedure that is illustrated in FIG. 1. Reference to electrophoretic deposition may be understood as a process in which the nanostructures herein (nanoparticles, nanotubes, nanoplatelets) suspended in a liquid medium migrate under the influence of an electric field (electrophoresis) and are deposited onto an electrode. The preferred coating apparatus 10 therefore includes a feed spool 12, a conductive substrate such as a charged foil electrode (cathode) 14, a takeup spool 16, and an inert plate electrode (anode) 18 in the deposition bath 20. More specifically, the conductive foil 14 is charged and fed from spool 12 into the coating bath and positioned at a selected distance from the inert counter electrode (anode) 18. An electric potential is applied, causing deposition to occur for that time period that the foil 14 is between the rollers and in the deposition bath. As may be appreciated, longer bath time and/or increased dimensions may be used to increase the residence time at a given voltage in order to increase throughput rates. The thickness of the coatings produced herein may be in the range of 10 μm to 1000 μm, including all values therein, in 1.0 μm increments. In addition, periodically, the voltage may be reversed or toggled in order to unsettle the deposition process and allow for reorganization and closer packing of the composite film. For example, the deposition of the earlier mentioned and preferred inorganic nanoparticles (platelets) of a LDH may be allowed to reorganize and pack more closely within a selected organic matrix. Accordingly, the densities of the films that may be produced herein may be in the range of 1.0-3.0 g/cc.

The voltage that may be applied between the charged foil electrode (cathode) 14 and inert plate electrode 18 may be in the range of 100-100,000 V/m. As noted above with respect to the toggling or reversal of the applied voltage, such may occur for a period of 10-10,000 millisecond, including all values and increments therein. In addition, materials for the charged foil electrode (cathode) 14 include metallic material, such as gold, aluminum, magnesium, titanium, cobalt, chromium, iron, stainless steel, and alloys thereof. The materials may also include conductive polymers, graphite filled polymers, and/or metalized polymers (polymer containing one or more of the aforementioned metals). It should also be noted that the conductive substrate may be patterned or porous.

In accordance with the above, the deposition bath 20 is preferably an organic medium wherein the water content of such medium is at or below 10% by volume. Accordingly, the water content of the organic medium may be 1%, 2%, 3%, 4%, 5%, 6%, 7%, 8% or as noted, 10% by volume. More specifically, deposition from such an organic liquid medium is preferred as the herein described hydrophobic materials (e.g., polymer or monomer matrix and nanostructures of inorganic materials) may be directly incorporated in such media. In addition, the use of such media assists in avoiding electrochemical reactions of the media with the metallic substrates. One preferred organic liquid medium is a furan solvent based medium, more preferably tetrahydrofuran, and more preferably 2-methyltetrahydrofuran. One may also utilize ketone solvents, such as 2-butanone.

The nanostructures for deposition herein, such as the nanoparticles may now be dispersed in a relatively polar organic medium before and during the deposition. As disclosed herein, such dispersion into an organic medium may be facilitated by an exchange from an aqueous medium. As noted, the nanostructures may also include one or more of the following: (1) ionic and/or nonionic surfactants; (2) monomeric, oligomeric (MW≤5000) or polymeric resins (MW>5000) which may include hydrophobic and hydrophilic functionality. Again, the aforementioned surfactants and monomeric, oligomeric or polymeric resins may also be covalently bonded to the surface of the nanostructures herein which may therefore improve their ability to exchange from the aqueous phase into the organic phase in the ensuing electrophoretic deposition.

In the case of utilizing the representative double hydroxide gibbsite, which is available in nanoplatelet form having a preferred width of, for example, 100 nm-200 nm and a preferred thickness of 5 nm to 20 nm, it can now be appreciated that such platelets may be exchanged into the organic solvent via surface modification. For example, the ionic (protonated) surface of the double hydroxide gibbsite may be treated with a surfactant, such as an ionic surfactant, and preferably one may employ sodium dodecylbenzene sulfonate. One may also preferably employ a quaternary amine based surfactant, such as Adogen 464™ (methyltrialkyl($C_8$-$C_{10}$)ammonium chloride).

In addition to, or even separate from the use of a surfactant, and as alluded to above, one may incorporate polymerizable groups to the nanostructure surface having hydrophobic and hydrophillic character, such as vinyl type (hydrophobic) functionality that may then improve distribution in a given organic medium. For example, one may include on the nanostructure surface (e.g. the inorganic nanoparticle) a vinyl benzene type functionality wherein the benzene ring includes an ionic group (e.g. a sulfonate group) which ionic group may associate with the aqueous phase. Other vinyl type functionality that is contemplated for use includes the earlier mentioned siloxane polymers, preferably containing allyl, acrylate, and/or styryl functionality.

The modified nanoparticles may then be placed in and then sedimented from an aqueous suspension by centrifugation. An aqueous suspension may be understood as a suspension of the nanoparticles in a continuous water medium. An aprotic organic solvent (i.e. a solvent that will not donate a proton) such as toluene may then be added to the recovered sediment. The sediment may then be sonicated and any residual water removed by azeotropic distillation. Once in the aprotic organic solvent, the particles may be further treated with the above referenced polymers, specific examples of which may include trimethoxysilylpropylmethacrylate, aminopropyltrimethoxysilane, and glycidoxypropyltrimethoxysilane. As may be appreciated, this can provide surface functionality to the particles for an ensuing polymerization type reaction. Thereafter, the particles may be sedimented and resuspended multiple times (e.g. up to 5 times) to provide a suspension in the preferred organic medium.

Upon completion of deposition the nanostructured composite may be released from the charged foil electrode 14 in sheet form and pressed into a relatively void free material (i.e. the percent of voids present at a level of less than or equal to 5.0% by volume, and in the range of 0.1 to 5.0% by volume). Voids may be understood as open regions within the composite material produced herein. The composite produced according to the electrophoretic process also may include nanostructured domains exhibiting liquid crystalline order. For example, in the case of nanoplatelets, the long dimension of the platelets may be orientated parallel to the electrode surface to provide a nematic structure (the long axis of the platelets preferably oriented in one direction). The volume fraction of platelets having such nematic structure may be at a level of 40% by volume or higher. Such orientation therefore provides relatively high modulus values in the direction of orientation as well as improvements in fracture-toughness.

Figure 2:
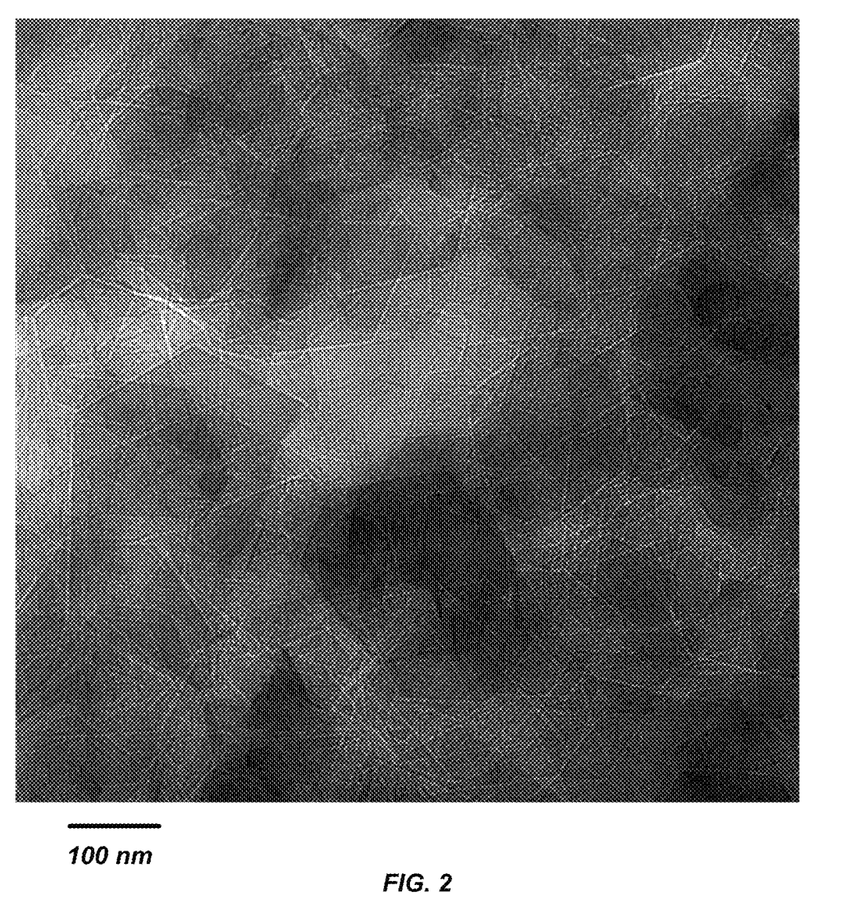
FIG. 2 is a transmission electron micrograph (TEM) of polymerized dimethacrylate film containing 50% v/v silane treated gibbsite nanoplatelets.
Figure 3A:
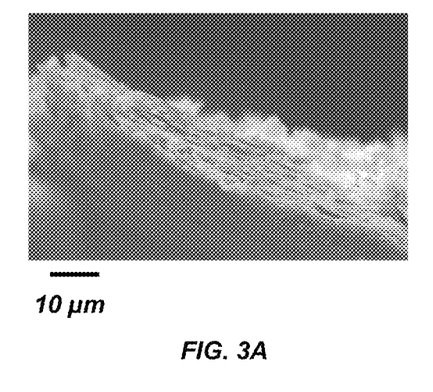
FIGS. 3A, 3B and 3C are sectional views of a deposited film containing 50% v/v silane treated gibbsite particles in non-polymerized dimethacrylate resin.
Figure 3B:
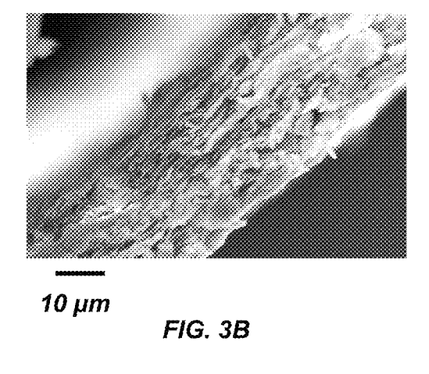
Figure 3C:
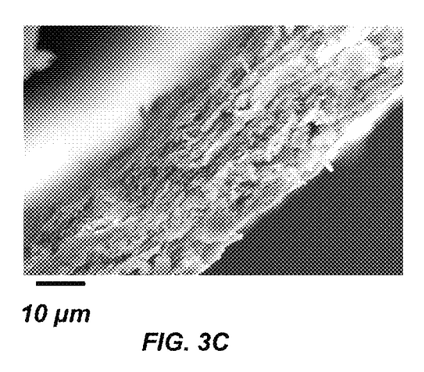
Figure 4:
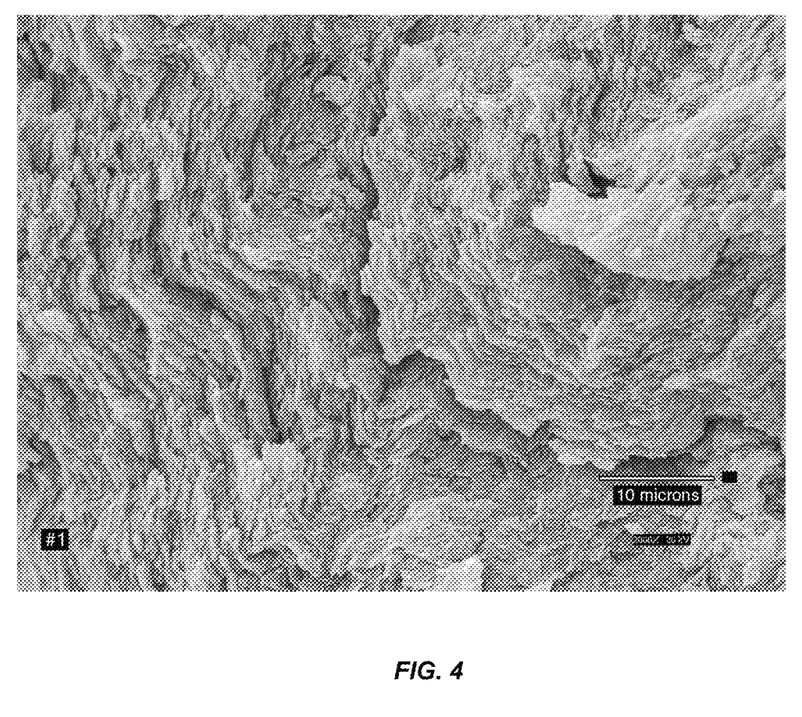
FIG. 4 is a fracture surface scanning electron microscopy (SEM) image showing oriented gibbsite nanoplatelet layers.
Figure 5A:
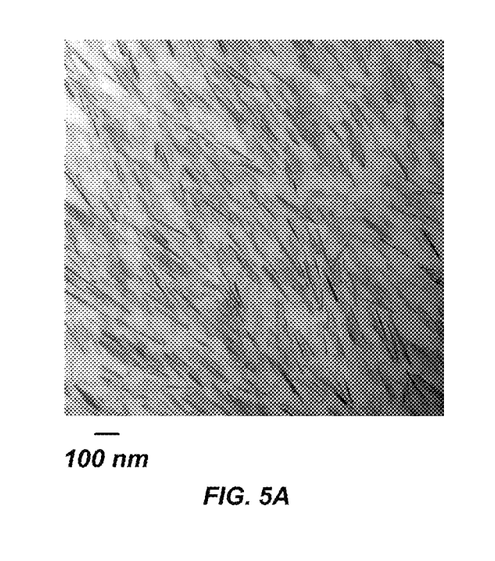
FIGS. 5A and 5B are cross-sectional TEM of gibbsite nanocomposites containing 42% v/v gibbsite nanoplatelets in a poly(dimethacylate) matrix.
Figure 5B:
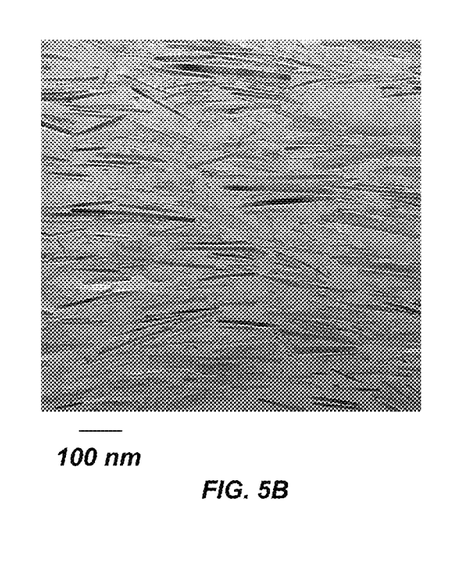
Figure 6:
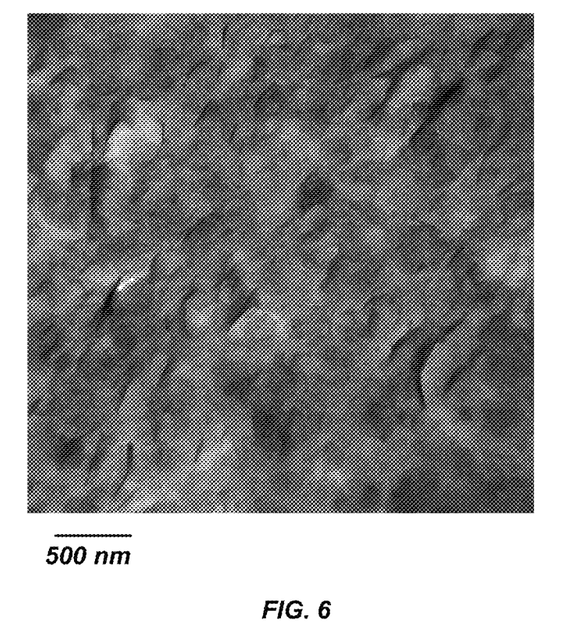
FIG. 6 shows reoriented gibbsite nanoplatelets normal to the principal (planar) orientation following mechanical agitation of a previously oriented nanocomposite film.

FIG. 2 shows the transmission electron micrograph of a polymerized dimethacrylate film containing 50% v/v silane treated gibbsite nanoplatelets sectioned from compressed a bulk material prepared by the deposition process disclosed herein. FIGS. 3A, 3B and 3C provide sectional views of a deposited film containing 50% v/v silane treated gibbsite particles in a matrix of non-polymerized dimethacrylate resin. FIG. 4 is a fracture surface SEM image showing the oriented gibbsite platelet layers and pull-out zones within a fully polymerized dimethacrylate resin matrix. A pull-out zone may be understood as fracture-surface pits where a fiber or particle previously occupied the volume but has since been pulled out during the fracture event. As can be seen the layer orientation has been largely preserved. FIG. 5A and FIG. 5B are cross-sectional transmission electron micrographs of gibbsite nanocomposites containing 42% v/v gibbsite nanoplatelets in a polymerized dimethacrylate matrix. As can be seen, the overall platelet orientation is preserved through liquid crystal-like flow despite multiple pressing and folding operations. These organized domains may flow under the influence of mechanical forces as the nanoplatelets slip past one another in the matrix. This liquid-crystal like flow may be manipulated to either preserve platelet orientation or to form interpenetrating domains where the layer orientation may be shifted, such as a shift up to 90°. See FIG. 6. Such interpenetrating structures, which are locally anisotropic but globally random in distribution, may now provide for the increased fracture resistance needed for long service life in applications such as dental restorative resins or bone engineering scaffolds.

It may therefore now be appreciated that the present disclosure will have utility in various biomedical applications, namely the placement of relatively tough, strong, and durable polymer-matrix composites as relatively long-lasting substitutes for tooth and bone structures. The disclosure herein has described a scalable method for electrophoretic roll-to-roll deposition (EPD) of relatively thick (10-1000 μm) nanocomposite films containing a relatively high volume fraction, of, e.g., inorganic nanoplatelets onto a conductive foil substrate or metallic target from organic solution. The nanocomposite materials herein may, as noted, optionally removed from the substrate and formed into bulk materials by rolling or lamination to now produce, e.g. dental restorative resins. Static coatings are also contemplated for bulk metal objects and/or metalized surfaces.

EXPERIMENTAL EXAMPLES

Aqueous LDH Nanoparticle Preparation

An aqueous suspensions of gibbsite nanoplatelets were prepared by a similar method to that described by Van der Kooij and Lekkerkerker in the *J. Physical Chemistry* 102, 7829 (1998). Aluminium tri-sec-butoxide (20 g, 0.08 mol), aluminium isopropoxide (16.5 g, 0.8 mol), and dilute HCl (900 mL, 0.09 M) were added to a 1 L polyethylene bottle. The sealed jar was then mechanically shaken for ~24 hours. The sample was then removed from the shaker and autoclaved in a convection oven at 85° C. for 72 h. After cooling to room temperature, the translucent blue-white suspension was poured into a 1 L pre-treated dialysis bag and dialysized for three days within a bucket containing 5 gallons of deionized (DI) water. The water was exchanged twice daily for two days to achieve pH≈4.5. The suspension was then centrifuged at 2300×g for 4 h. The sedimented particles were isolated and redispersed in fresh DI water. This was repeated three times to reduce the particle size distribution. The polydispersity may be less than or equal to 50% following sedimentation and redispersion. This may be due to the elimination of relatively fine particles (<20 nm). The final suspension remained slightly acidified, with pH≈5.0.

Surface Treatment and Solvent Exchange with Sodium Sulfonates

From the size-selected aqueous gibbsite dispersion (pH≈5.0, [Al(OH)$_3$]=4 g/L), 1 L samples were treated with sodium dodecyl benzene sulfonate (SDBS, 4 g) and sonicated. The size-selected gibbsite dispersion is reference to the optional elimination of relatively fine particles noted above. The particles were isolated by centrifugation and then redispersed directly into toluene by sonication, resulting in a cloudy, relatively unstable suspension. Residual water was removed from this suspension by azeotropic distillation using a Dean-Stark trap. Lastly, the particles were conditioned with three additional sedimentation/redispersion cycles to remove excess surfactant. Fresh toluene was added after the first two cycles, but the final dispersion of SDBS-treated gibbsite (DBS-G) was produced using a polar organic solvent such as 2-methyl tetrahydrofuran (MeTHF) or 2-butanone (MEK).

A portion of the SDBS may be optionally replaced with a polymerizable species, such as sodium styrene sulfonate (SSS). About 30 mol % is a preferred replacement level for SSS since higher levels may adversely affect suspension stability. The level of replacement of the SDBS as one example of a surfactant associated with the nanostructures herein may therefore be between 0.1-30 mol % of a polymerizable species containing hydrophilic and hydrophobic type functionality.

Silane Post-Treatment

For silanated samples, trimethoxysilylpropylmethacrylate (TMSPM) was added to the anhydrous toluene suspension of sulfonated nanoparticles, following one centrifuge cycle, in the amount of 0.5 g per gram of gibbsite. The suspension was sonicated for 30 minutes and then allowed to equilibrate for 24 hours at room temperature. Final centrifugation and exchange of the silanated nanoparticles was carried out in an equivalent manner to the standard DBS-G particles. The silane may therefore serve to reduce particle agglomeration, as observed by reduced polydispersity in light scattering profiles, and also provides a copolymerizable tether for bonding the particles to dimethacrylate resins.

Electrophoretic Deposition

A roll-to-roll coating apparatus consisting of a feed spool, a takeup spool, and a suspension bath was constructed as diagrammed in FIG. 1. A stainless-steel plate electrode was immersed within the bath beneath the foil as it passes between two rollers. The apparatus was used to continuously coat a 35 mm-wide ribbon of 1 mil-thick annealed stainless steel (Brown Metals Company, Los Angeles, Calif.). Voltage was applied between the foil and the static electrode via a charged spring contact and varied between 5 V/cm and 30 V/cm. Sulfonated nanoparticles were electrophoretically deposited from suspension in either MeTHF or MEK. The foil was passed through the bath containing a nanoparticle suspension as well as co-dissolved dimethacrylate monomer providing a swollen film that was dried in air to yield the final nanocomposite composition. The ratio of monomer to solids was varied between 5:1 and 2:1, providing solids loadings in the range of 55-90% (w/w) in the cast composite.

It should be noted herein that in general, the ratio of dissolved monomer mass to suspended nanostructures (e.g. platelets) is independent of the overall platelet concentration. That is, the amount of monomer retained in the composite films formed herein was in general observed to be dependent upon the hydrodynamic interactions with the platelets, which may then require a relatively high monomer concentration. It also turns out that the ratio of monomer to solids is actually less important than the ratio of monomer to solvent. The ratio of monomer to solvent may be varied between 5.0% (w/w) and 20% (w/w). Higher monomer loadings lead to lower solids loading.

Inclusion of Polymerization Initiator

The previously prepared dimethacrylate-containing suspension was augmented with dicumylperoxide at either 8% or 4% by weight of the monomer. High-pressure liquid chromatography revealed that the resulting proportion of initiator within the dimethacrylate resin was 4.5% and 3.5% by weight, respectively. Thus, a small, neutral, organic species was observed to co-deposit with the charged nanoparticles and hydrodynamically dragged monomer.

It should also be appreciated that all of the various embodiments noted herein are interchangeable and features within any of the drawings may be used within each of the respective drawings, to optimize any and all of the disclosed characteristics of the nanostructured composites noted herein. The foregoing description of several methods and embodiments has been presented for purposes of illustration. It is not intended to be exhaustive and many modifications and variations are possible in light of the above teaching.

What is claimed is:

1. A method of forming a composite material containing nanostructures comprising:
   mixing nanostructured solids with a vinyl-sulfonate and an ionic surfactant to form vinyl-sulfonate, ionic surfactant-coated nanostructured solids;
   mixing said vinyl-sulfonate, ionic surfactant-coated nanostructured solids in an organic liquid media so as to form a mixture, wherein said media has a water content of less than or equal to 10.0% by volume and said organic liquid media includes an organic polymerizable matrix material or polymers of the formula:

wherein R1 and R2 may be selected from hydrogen, alkyl groups, alkylene groups, aromatic groups, ester groups, carboxylic acid groups and metal salts thereof, wherein n has a value of 10-10,000;
   applying an electric field to said mixture in the presence of a conductive substrate; and
   depositing on said conductive substrate a composite material containing said nanostructured solids and said organic matrix material.

2. The method of claim 1 wherein said nanostructure solids comprise nanoparticles, nanotubes or nanoplatelets.

3. The method of claim 2 wherein said nanostructures have at least one size dimension of 1 nm to 999 nm.

4. The method of claim 1 wherein said nanostructures comprise platelets with an aspect ratio of length divided by diameter of greater than or equal to 3.0.

5. The method of claim 1 wherein said deposited composite material has a thickness of 10 μm to 1000 μm.

6. The method of claim 1 wherein the level of voids in said deposited organic matrix material containing said nanostructured solids is less than or equal to 5.0% by volume.

7. The method of claim 1 wherein said nanostructured solids comprise layered double hydroxides of the formula:

wherein $M^{z+}$ and $M^{3+}$ are two or more metals of different valence, x may range from 0.2 to 0.5, n can be any positive whole number, y can be zero or any positive number, q=x or q=2x-1, z=1 or z=2.

8. The method of claim 7 wherein z=2, q=x and $M^{z+}$=$Ca^{2+}$, $Mg^{2+}$, $Mn^{2+}$, $Fe^{2+}$, $Co^{2+}$, $Ni^{2+}$, $Cu^{2+}$ or $Zn^{2+}$.

9. The method of claim 7 wherein z=1, q=2x-1 and $M^{z+}$=$Li^+$ and $M^{3+}$=$Al^{3+}$.

10. The method of claim 1 wherein said organic matrix material comprises vinyl based monomers [$CH_2$=$C(R1)(R2)$]
   wherein R1 and R2 may be selected from hydrogen, alkyl groups, alkylene groups, aromatic groups, ester groups, carboxylic acid groups and metal salts thereof.

11. The method of claim 1 wherein said deposited material containing said nanostructured solids has a thickness of 10 μm to 1000 μm.

12. The method of claim 1 including a conductive substrate capable of moving continuously through said organic media and a corresponding stationery electrode in said organic media and wherein an electric potential is applied between said conductive substrate and stationery electrode.

13. The method of claim 12 wherein said potential is in the range of 100 V/m to 1,000,000 V/m.

14. The method of claim 12 wherein said potential is applied for a time period of 10 milliseconds to 10,000 milliseconds and wherein said potential is reversed between said electrodes during said time period.

15. The method of claim 1 wherein said nanostructured solids are present at a level up to 80% by volume in said organic matrix material.

16. The method of claim 1 wherein said nanostructured solids include ionic or non-ionic surfactants.

17. A method of forming a composite material containing nanostructures comprising:
mixing a nanostructured solid with a vinyl-sulfonate and an ionic surfactant to form vinyl-sulfonate, ionic surfactant-coated nanostructured solid;
placing said vinyl-sulfonate, ionic surfactant-coated nanostructured solid in an aqueous liquid medium and exchanging said aqueous medium for an organic liquid media wherein said organic media has a water content of less than or equal to 10.0% by volume;
mixing an organic matrix material in said organic liquid media forming a mixture;
applying an electric field to said mixture in the presence of a conductive substrate; and
depositing on said conductive substrate a composite material containing said nanostructured solids and said organic polymerizable matrix material or polymers of the formula:

$$*\!-\!\!\left[\!CH_2\!-\!\!\underset{R2}{\overset{R1}{C}}\!\right]_n\!\!-\!*$$

wherein R1 and R2 may be selected from hydrogen, alkyl groups, alkylene groups, aromatic groups, ester groups, carboxylic acid groups and metal salts thereof, wherein n has a value of 10-10,000.

18. The method of claim 17 wherein said exchanging of said aqueous liquid medium with said organic liquid medium comprises placing said nanostructured material in an aqueous liquid medium wherein said particles are recovered from said suspension and said recovered particles are placed in an organic solvent wherein residual water is then removed by distillation.

19. The method of claim 17 wherein said nanostructure solids comprise nanoparticles, nanotubes or nanoplatelets.

20. The method of claim 17 wherein said nanostructures have one size dimension of 1 nm to 999 nm.

21. The method of claim 17 wherein said nanostructures comprise platelets with an aspect ratio of length divided by diameter of greater than or equal to 3.0.

22. The method of claim 17 wherein said deposited composite material has a thickness of 10 μm to 1000 μm.

23. The method of claim 17 wherein the level of voids in said deposited organic matrix material containing said nanostructured solids is less than or equal to 5.0% by volume.

24. The method of claim 17 wherein said nanostructured solids comprise layered double hydroxides of the formula:

$$[M^{z+}{}_{1-x}M^{3+}{}_x(OH)_2]^{q+}(X^{n-})_{q/n}\cdot yH_2O]$$

wherein $M^{z+}$ and $M^{3+}$ are two or more metals of different valence, x may range from 0.2 to 0.5, n can be any positive whole number, y can be zero or any positive number, q=x or q=2x−1, z=1 or z=2.

25. The method of claim 24 wherein z=2, q=x and $M^{z+}=Ca^{2+}$, $Mg^{2+}$, $Mn^{2+}$, $Fe^{2+}$, $Co^{2+}$, $Ni^{2+}$, $Cu^{2+}$ or $Zn^{2+}$.

26. The method of claim 24 wherein z=1, q=2x−1 and $M^{z+}=Li^+$ and $M^{3+}=Al^{3+}$.

27. The method of claim 17 wherein said organic matrix material comprises vinyl based monomers [$CH_2=C(R1)(R2)$]
wherein R1 and R2 may be selected from hydrogen, alkyl groups, alkylene groups, aromatic groups, ester groups, carboxylic acid groups and metal salts thereof.

28. The method of claim 17 wherein said deposited material containing said nanostructured solids has a thickness of 10 μm to 1000 μm.

29. The method of claim 17 including a conductive substrate capable of moving continuously through said organic media and a corresponding stationery electrode in said organic media and wherein an electric potential is applied between said conductive substrate and stationery electrode.

30. The method of claim 29 wherein said potential is in the range of 100 V/m to 1,000,000 V/m.

31. The method of claim 29 wherein said potential is applied for a time period of 10 milliseconds to 10,000 milliseconds and wherein said potential is reversed between said electrodes during said time period.

32. The method of claim 17 wherein said nanostructured solid is present at a level up to 80% by volume in said organic matrix material.

33. The method of claim 17 wherein said nanostructured solid includes ionic or non-ionic surfactants.

34. A method of forming a composite material containing nanostructures comprising:
mixing nanostructures containing layered double hydroxides in platelet form with a vinyl-sulfonate and an ionic surfactant to form vinyl-sulfonate, ionic surfactant-coated nanostructured platelets;
mixing said vinyl-sulfonate, ionic surfactant-coated nanostructured platelets in an organic liquid media so as to form a mixture, said platelets having an aspect ratio of greater than or equal to 3.0 wherein said organic media has a water content of less than or equal to 10.0% by volume and said organic liquid media includes an organic polymerizable matrix material or polymers of the formula:

$$*\!-\!\!\left[\!CH_2\!-\!\!\underset{R2}{\overset{R1}{C}}\!\right]_n\!\!-\!*$$

wherein R1 and R2 may be selected from hydrogen, alkyl groups, alkylene groups, aromatic groups, ester groups, carboxylic acid groups and metal salts thereof, wherein n has a value of 10-10,000;
applying an electric field to said mixture in the presence of a conductive substrate; and
depositing on said conductive substrate a composite material containing said nanostructured platelets and said organic matrix material, wherein said composite material has a thickness of 10 μm to 1000 μm, said layered double hydroxides present at a level of up to 80% by volume in said organic matrix and the level of voids in said deposited organic matrix material containing said nanostructured solids is less than or equal to 5.0% by volume.

* * * * *